United States Patent
Klingman (12)

(10) Patent No.: US 6,584,525 B1
(45) Date of Patent: Jun. 24, 2003

(54) ADAPTATION OF STANDARD MICROPROCESSOR ARCHITECTURES VIA AN INTERFACE TO A CONFIGURABLE SUBSYSTEM

(76) Inventor: Edwin E. Klingman, 3000 Highway 84, San Gregorio, CA (US) 94074

( * ) Notice: Subject to any disclaimer, the term of this patent is extended or adjusted under 35 U.S.C. 154(b) by 0 days.

(21) Appl. No.: 09/443,944

(22) Filed: Nov. 19, 1999

Related U.S. Application Data (60) Provisional application No. 60/109,235, filed on Nov. 19, 1998.

(51) Int. Cl.[7] ............................................. G06F 13/00
(52) U.S. Cl. ..................... 710/118; 710/305; 710/101
(58) Field of Search ............................... 710/118, 125, 710/305–315, 101

(56) References Cited

U.S. PATENT DOCUMENTS

| | | | | |
|---|---|---|---|---|
| 5,568,621 A | * | 10/1996 | Wooten | 710/112 |
| 5,621,900 A | * | 4/1997 | Lane et al. | 710/120 |
| 5,715,411 A | * | 2/1998 | Verdun | 710/107 |
| 5,857,084 A | * | 1/1999 | Klein | 710/305 |
| 5,935,223 A | * | 8/1999 | Griffith et al. | 710/36 |
| 6,035,354 A | * | 3/2000 | Klein | 710/303 |

\* cited by examiner

*Primary Examiner*—Paul R. Myers
(74) *Attorney, Agent, or Firm*—Anthony B. Diepenbrock, III; Oppenheimer Wolff & Donnelly LLP (57) ABSTRACT

A system for extending standard processors using either undefined op-codes or sparse address spaces to maintain the use of legacy processor tools and reduce the complexity of the design process. The disclosure describes a method and apparatus for adding circuitry to processing units that allows partitioning of the design into a fixed processing unit derivative and a configurable subsystem. The legacy processor unit language tools work with the fixed processing unit derivative while the logic design tools work well with the configurable subsystem. In one embodiment, the configurable subsystem is implemented with easily available programmable Logic Devices (PLD's and FPGA's).

29 Claims, 8 Drawing Sheets

ADAPTATION OF STANDARD MICROPROCESSOR ARCHITECTURES VIA AN INTERFACE TO A CONFIGURABLE SUBSYSTEM

CLAIMING BENEFIT OF EARLIER FILING DATE AND CROSS-REFERENCES TO OTHER APPLICATIONS

This application claims priority to U.S. provisional application entitled "A Microprocessor Interface To A Configurable Subsystem", filed on Nov. 19, 1998, Ser. No. 60/109,235.

BACKGROUND OF THE INVENTION

1. Field of the Invention

The present invention is generally in the field of microprocessor design and more specifically in the field of microcontroller design and extensions thereto.

2. Description of the Related Art

Certain microprocessors or micro-controllers have been sold in quantities of hundreds of millions. The processors have been available for years, in some cases for decades (8048 since 1976, 8051 since 1980). As a result, tens or hundreds of thousands of programmers have learned the architecture and written programs for the architecture. In addition, sophisticated tools have been designed to facilitate designing with these architectures.

Recently, configurable array technologies have evolved to the point that complete processors can be designed and implemented in a single configurable array, such as an Altera Flex 10K FPGA (Field Programmable Gate Array). In theory, designers can now tailor such popular processor architectures as they wish, by adding features or changing memory size. However, in practice, the task of designing a processor or modifying its architecture is a tremendous task, and generally requires giving up the tools that have been developed for the original (unmodified) architecture. The modified processor is no longer supported by the legacy processor tools and creating a modified processor is complex and time consuming. Moreover, the logic tools needed to design with programmable logic are incompatible with the legacy tools that have evolved to support current processor system architectures such as the one shown in FIG. 1.

What is needed are ways to modify a processing system so that the "legacy" tools developed for the unmodified architecture can still be used and so that a configurable subsystem can attach to the processing system to extend the functions of the architecture without involving alterations to the processing system.

BRIEF SUMMARY OF THE INVENTION

The present invention is directed to a method and apparatus that satisfies the above needs. A system in accordance with the present invention includes an central bus for carrying address, data and control signals relating to the address and data on the central bus and an I/O port, connected to the central bus, where the I/O port forms an extended bus having address and data signals and control signals, including a select signal, relating to the address and data signals on the extended bus. The system further includes a functional unit connected to the central bus and having an inexhaustively decoded space, where the use of an unassigned location in the space causes the activation of the select signal on the extended bus. Data is transferable between the central bus and the extended bus when the select signal is activated on the extended bus.

In one version of the present invention, the functional unit includes an instruction processing unit and a register set residing in the inexhaustively decoded space. Executing an instruction that references an unassigned location in the space causes the activation of the select signal.

In another version of the present invention, the functional unit includes an instruction processing unit for executing instructions residing in the inexhaustively decoded space and the instruction processing unit executes an instruction at an unassigned location in the inexhaustively decoded space to cause the activation of the select signal.

A method in accordance with the present invention includes the steps of: forming an extended bus from an I/O port connected to an central bus of a processing system, where the extended bus includes address data and control signals, including a select signal, relating to the address and data signals on the extended bus; executing an instruction in a functional unit connected to the central bus of the processing system and having an inexhaustively decoded space, where the instruction uses an unassigned location in the inexhaustively decoded space to cause the activation of the select signal on the extended bus; and transferring data between the central bus and the extended bus in response to executing the instruction causing the activation of the select signal.

An advantage of the present invention is that use of legacy tools for the unmodified processing system architecture is preserved because the instruction set activating the select signal is a standard instruction or an additional instruction. In either case, the instruction set and architecture of the unmodified processing system are not altered and existing tools still work with the modified system.

Another advantage is that configurable subsystem is kept separate from the processing system so that the designer has the flexibility to implement extended functions for the processing system independently of the processing system. This advantage is brought about by the extended bus to which the configurable subsystem attaches. The extended bus is designed to easily interface to most, if not all, of the available programmable logic arrays on the market, thereby delivering a great deal of flexibility in designing the configurable subsystems using the logic array vendors' tools.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
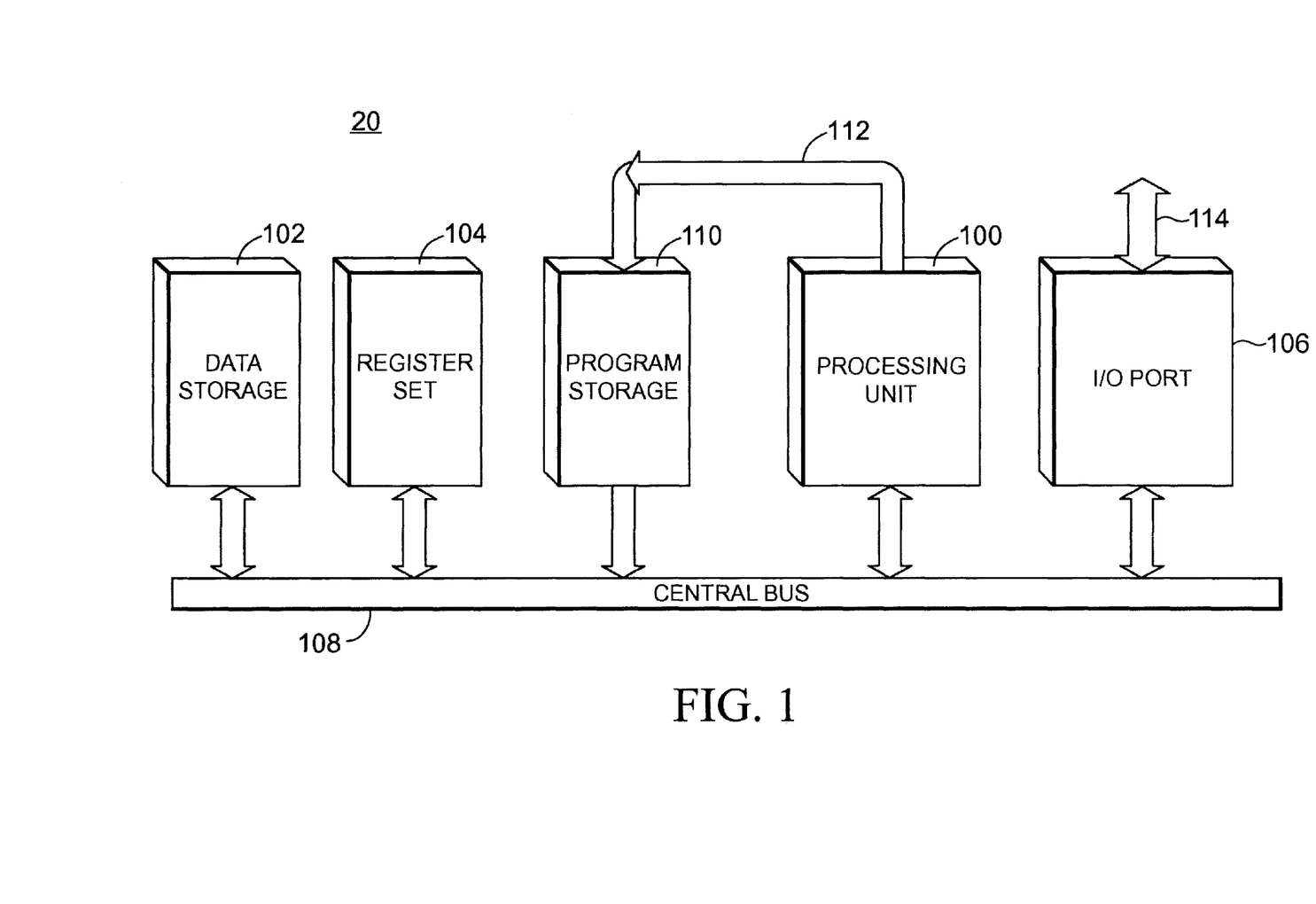
FIG. 1 shows a basic processing system which can be extended in accordance with the present invention.

FIG. 1 shows a basic processing system which can be extended in accordance with the present invention. The basic processing system 20 of FIG. 1 includes one or more functional units such as a processing unit 100, a data storage unit 102, a register set 104 and I/O port 106 or combinations thereof, all connected to a central bus 108. The processing unit 100 fetches and executes instructions from a program store unit 110 and typically includes a timing and control unit, an Arithmetic Logic Unit (ALU) and a program counter for addressing, over bus 112, instructions from the program storage unit 110. The data storage unit 102 is used to store data used by a program and the register set 104 contains one or more special purpose registers needed by the processing unit for executing instructions. Lastly, I/O port 106 allow the processing system to send and receive data to and from external devices over bus 114. The various units of the processing system communicate with each other over the central bus 108, which carries address, data and control information.

Figure 2:
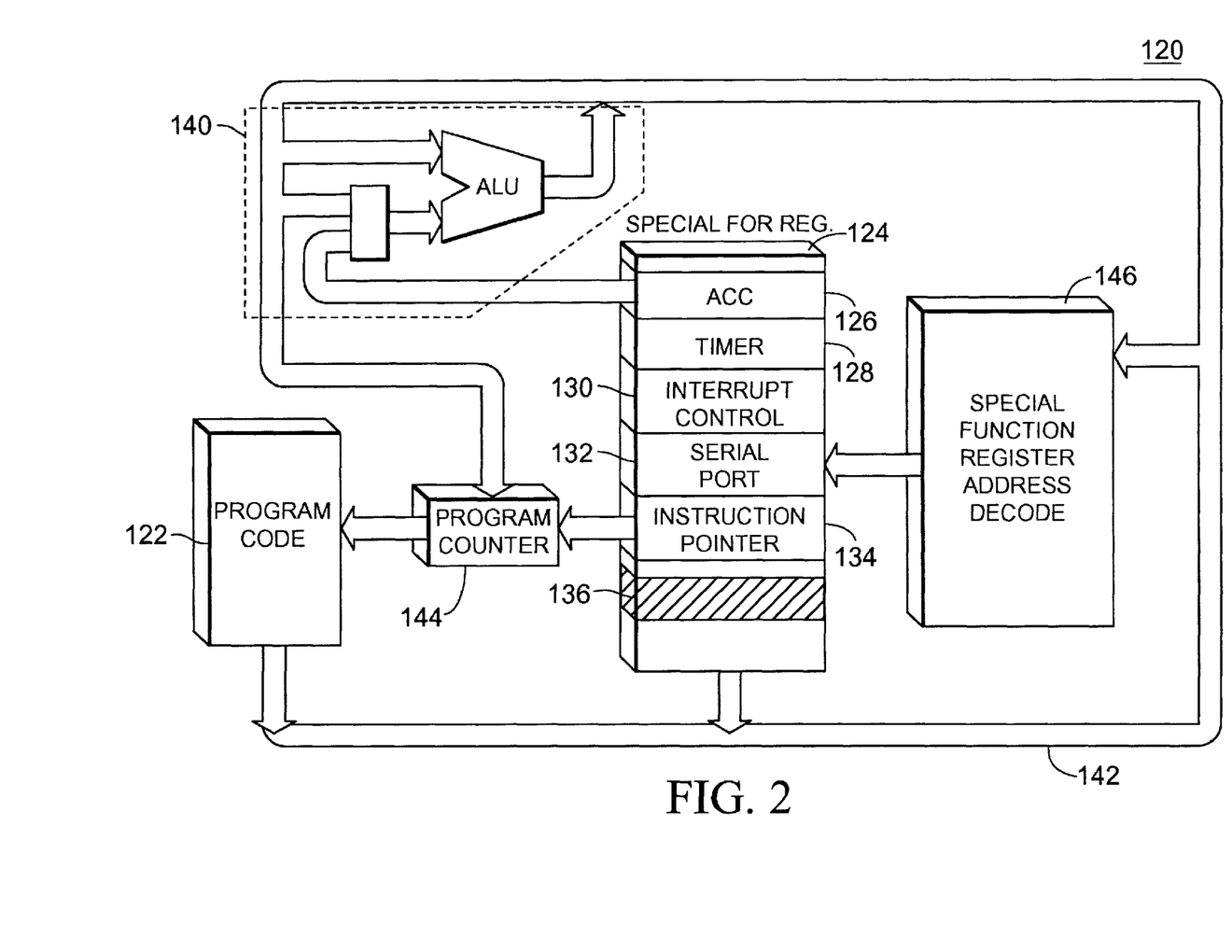
FIG. 2 shows a simplified block diagram of a particular processing system, such as an 8051, for use in the present invention.

FIG. 2 shows a simplified block diagram of a particular processing system 120, such as an 8051, for use in the present invention. In FIG. 2, the processing system includes a program storage unit 122, typically implemented by a Read-Only Memory for storing the program and a special function register set (SFR) 124, which includes an accumulator 126, a timer 128, an interrupt control register 130, a serial port control register 132, and an instruction pointer register 134. It is important to note that, for the 8051, the various registers of the special function register set are assigned to an address in a register address space that is larger than the number of implemented registers. This is illustrated by the hatched area 136 and means that some addresses in the register address space are not assigned to a register of the register set, thus forming an inexhaustively decoded address space. The processing unit includes an ALU 140, which is connected to the accumulator 126 in the register set 124 (and possibly other registers) and the central bus 142, and a program counter 144, which is connected to the instruction pointer register 134 of the special function register set 124 and the program ROM 122. The processing unit further includes an instruction decoder and timing and control unit (not shown) for carrying out the execution of instructions in the processing unit. A register set address decoder 146, connected to the central bus 142, decodes addresses on the central bus 142 to select a register in the register set 124. The I/O unit is not shown but is connected to the central bus and is discussed below.

Figure 3:
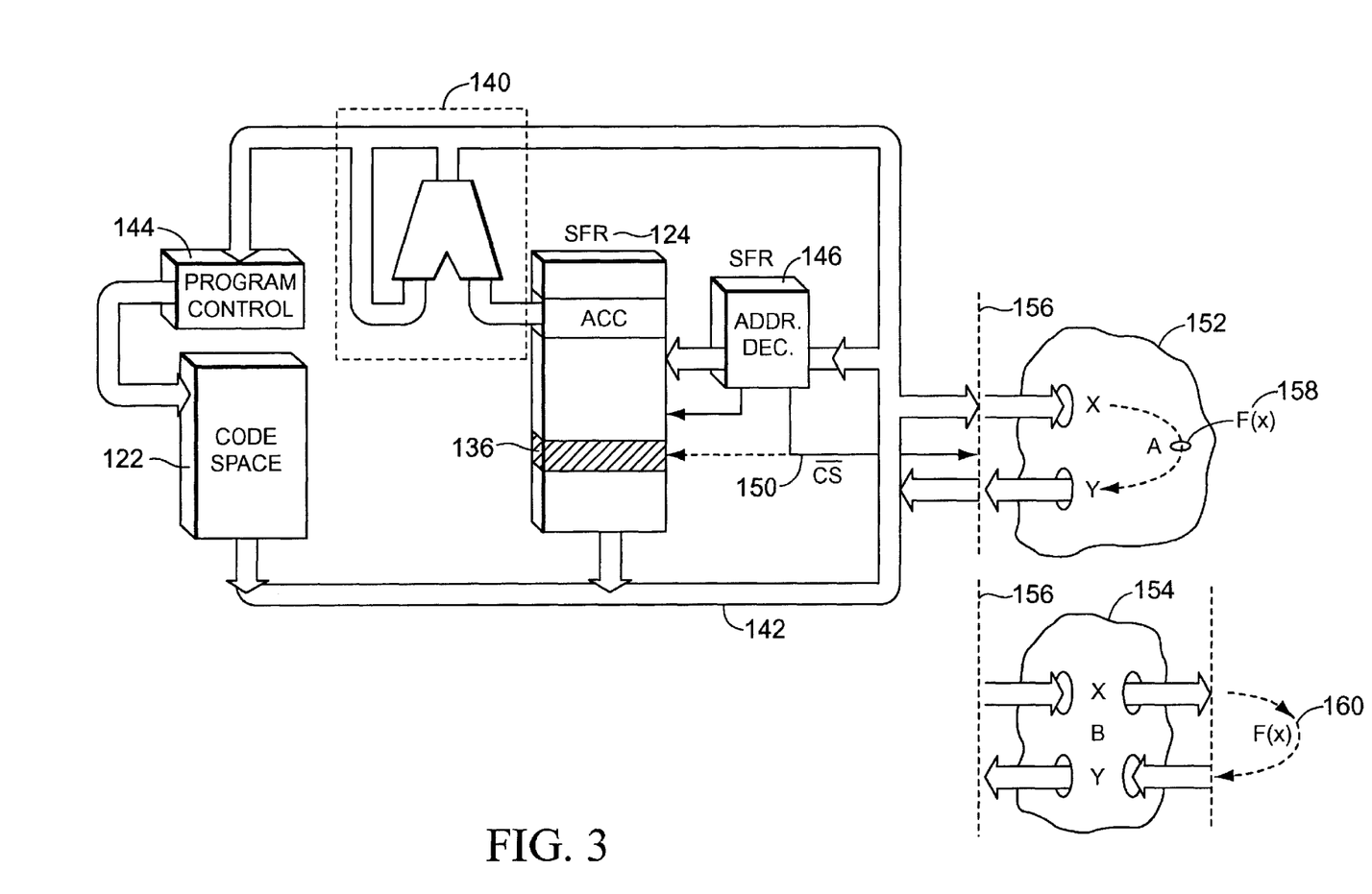
FIG. 3 shows an extension to the basic 8051 architecture capable of supporting both computational and input/output architectural extensions.

FIG. 3 shows an extension to the basic 8051 architecture capable of supporting both computational 152 and input/output architectural extensions 154. In particular, the address decoder 146 for the special function register set 124 is modified to provide a select line 150 on which a select signal, CS/ is activated when one of the unassigned addresses 136 is present on the address decoder input. The unassigned address 136 is caused to be present on the input to the address decoder when the processing unit executes an instruction that references the unassigned address 136. In FIG. 3, the select line 150 is used to enable either a computation extension 152 to the processing system or an input/output extension 154.

The computation extension 152 is a function, F(x) 158, performed on data, x, received via an interface 156 from the central bus and whose results y=F(x) 158, are returned via the interface 156 to the central bus.

An I/O architectural extension 154 is a channel, filter or translator function 160 in which data is passed to or from the central bus through an interface 156 from or to external circuitry.

Figure 4:
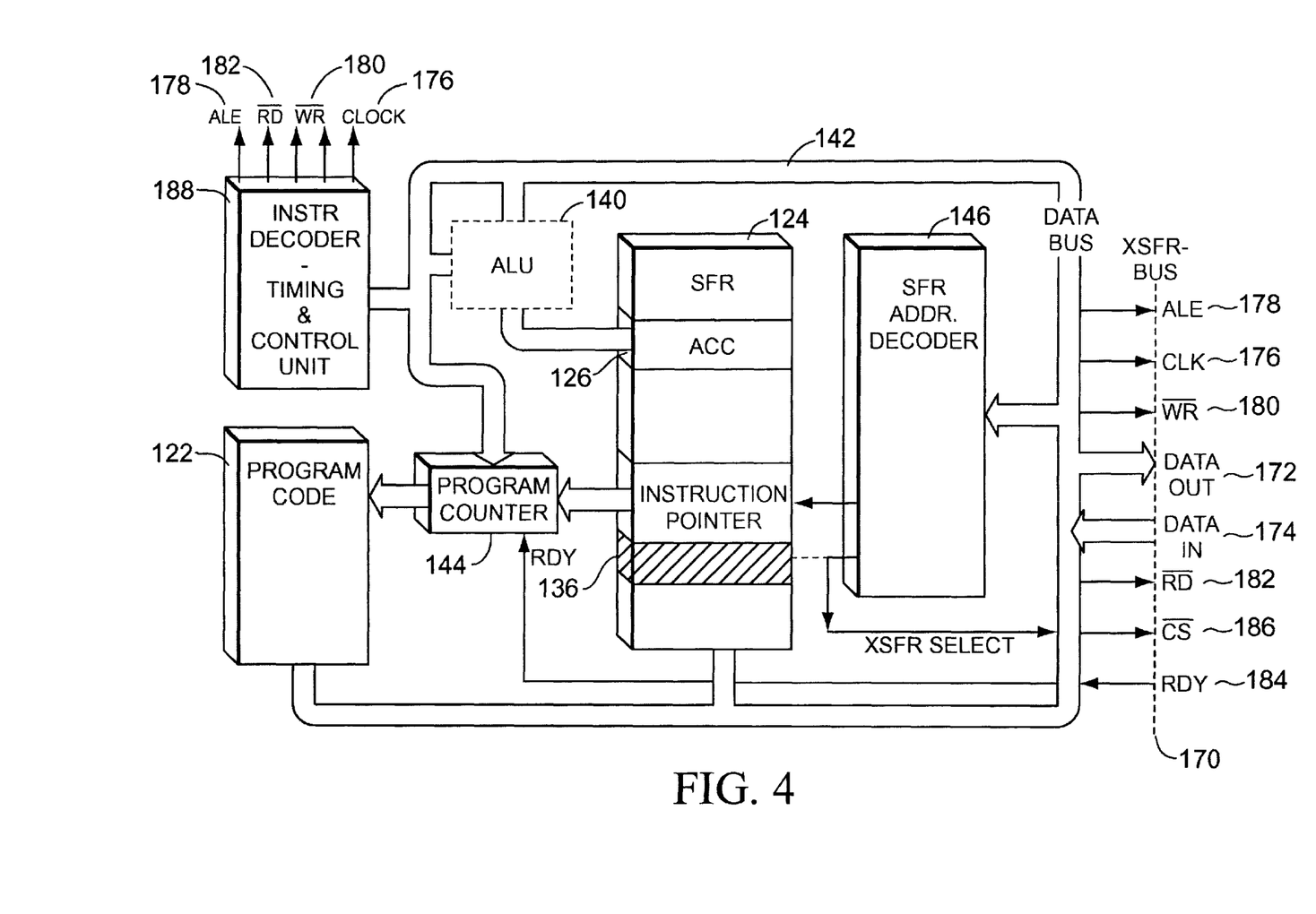
FIG. 4 shows the signals of an extended bus, called the XFSR-bus, for the typical processing system.

FIG. 4 shows the signals of an extended bus 170, called the XSFR-bus, for the typical processing system. The extended bus 170 includes one or more data paths 172 and 174 for transferring data to and from the central bus 142 to the extended bus 170 and a set of control signals which relate to the data transfers between the central bus 142 and extended bus 170. In particular, for an embodiment of the present invention in which an 8051 or 8051-derivative is used, the control signals include, CLK 176, ALE 178, WR/ 180, RD/ 182, RDY 184 and CS/ 186 (where a / after a signal name indicates the signal is active when it is in a logic low state). In this embodiment, the CLK 176 signal is a signal derived from a clock operating the processing system; ALE 178 is a signal which signals the presence of address information on the extended bus; RD/ 182 captures data from the extended bus; WR/ 180 indicates the presence of output data on the extended bus; RDY 184 indicates that the processing unit should stall while maintaining certain control signals active on the extended bus; and CS/ 186 indicates that an unassigned address 136 is referenced in an instruction being executed by the processing unit. Devices attached to the extended bus are enabled when the CS/ signal 186 is active. FIG. 4 also shows a portion of the processing unit, the instruction decoder and timing and control unit 188, which is responsible for decoding instructions and issuing timing and control signals to carryout the execution of instructions in the processing unit. Signals such as ALE 178, RD/ 182, WR/ 180 and CLK 176 for the extended bus 170 are provided by the timing and control unit 188 which is modified to force an external bus cycle (ALE and RD/ or WR/ ) when an instruction references an unassigned address 136 in the register set address space.

Figure 5:
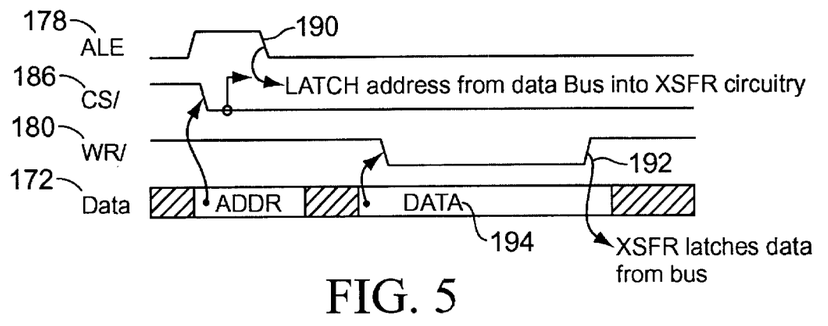
FIG. 5 shows a write operation in which data is transferred from a location in the processing system to configurable subsystem circuitry attached to the extended bus.
Figure 6:
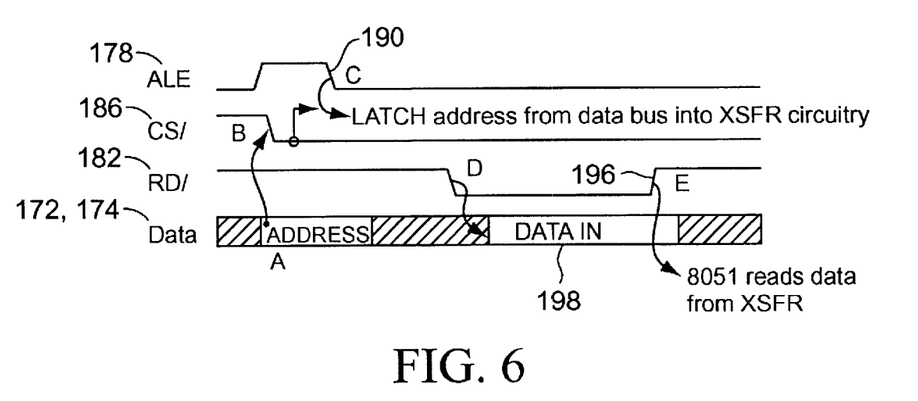
FIG. 6 shows a read operation in which data is transferred from configurable subsystem circuitry attached to the extended bus to a location in the processing system.

Operation of the system shown in FIG. 4 in one version of the invention is shown in FIGS. 5 and 6.

FIG. 5 shows a write operation in which data is transferred from the central bus to configurable subsystem circuitry attached to the extended bus. In this process, the program counter accesses the next instruction from the program store unit. For a move instruction as the next instruction, the processing unit is instructed to move data from a source location to a target location. During the execution of the move instruction, the processing unit references an unassigned address 136 in FIG. 4 in the special function register space as the target location. In this case, the timing and control unit 188 of the processing unit accesses the data from the source, places the data onto the central bus 142, and latches the data into a temporary latch, not shown. The processing system then places the unassigned register address 136 of the target onto the central bus, and the timing and control unit generates an ALE (address latch enable) signal 178 on the extended bus, as well as any necessary signals to enable the register set address decoder. The address decoder, in response, activates the special select signal, CS/ 186, to enable circuitry attached to the extended bus. This circuitry uses the falling edge 190 of the ALE signal 178 to capture the unassigned address 136 for decoding as shown in FIG. 5. After the address is captured, the timing and control unit 188 then causes the data from the source from the temporary latch to be placed onto the central bus, and a WR/ signal 180 to be activated. Because the register set address decoder recognizes the unassigned address 136, it does not enable any register in the register set. The WR/ signal 180, combined with the captured address and the CS/ signal 186, causes the desired data 194, appearing on the central bus, to be transferred to the extended bus interface 172 and into the configurable subsystem at a location based on the unassigned address. Typically, the configurable subsystem captures the data 194 on the trailing edge 192 of the WR/ signal 180.

FIG. 6 shows the transfer of data from configurable subsystem circuitry attached to the extended bus to a location in the processing system. In this case, the processing unit executes a move instruction in which the source location is an unassigned register set address and the target location is a location, such as a register, within the processing system. The move instruction is fetched from the program store unit and interpreted by the instruction decoder. The instruction decoder and the timing and control unit then cause the source address (an unassigned address) to be placed onto the extended bus 170 and the ALE signal 178 to be activated. The register set address decoder recognizes the unassigned address 136 and produces the CS/ signal 186 to enable the configurable subsystem to capture the address from the extended bus 170 on the trailing edge 190 of the ALE signal 178. The register set address decoder causes the registers in the register set to ignore this phase of the move operation. The configurable subsystem then decodes the latched, unassigned address and places its data 198 onto the extended bus 170 in response to the decoded address, the CS/ signal 186, and the RD/ signal 182. The trailing edge of the RD/ signal 196 is used to capture the data appearing on the extended bus 170 into a temporary latch (not shown) for transfer to the target register as described above.

In one embodiment of the present invention, the select signal, CS/ 186, is timed to occur before the trailing edge of the ALE signal 178. This serves to qualify the ALE signal 178 so that the circuitry attached to the extended bus 170 need only activate when it receives an ALE 178 when CS/ 186 is active.

In another embodiment of the present invention, the select signal, CS/ 186, is allowed to arrive later than the trailing edge of the ALE signal 178 but before either the RD/ 182 or WR/ 180 signal. This serves to qualify the RD/ 182 or WR/ 180 signals so that the circuitry attached to the extended bus 170 need only activate when it receives a RD/ 182 or WR/ 180 signal with CS/ 186 active. In this case, the circuitry must latch every address on the trailing edge of ALE 178 because CS/ 186 arrives too late to qualify ALE 178.

In some embodiments of the present invention, more than one unassigned address in the register set address space is decoded. In particular, the select line is activated when a group of addresses is decoded. One convenient group is a set of four addresses starting on a quad-byte boundary. For example, in an 8051 or 8051-derivative processing system addresses 200, 201, 202 and 203 (0C8H-0CAH) are unassigned in the 8051. Another similar group includes the addresses 204, 205, 206 and 207 (0CCH-0CFH) which are also unassigned in the 8051. Another convenient group of addresses is a set of eight addresses starting on a octbyte boundary.

In one version of the invention, the register set address is modified to distinguish between these two contiguous groups of addresses and to provide a separate select line for each group. In this case, the address decoder activates a signal, CS1/, on a first select line when a reference to an unassigned address falls within the addresses in the first group, and the address decoder activates a signal, CS2/, on a second select line when a reference to an unassigned address falls within the addresses in the second group. The existence of two select lines means that two configurable subsystems are attachable to the extended bus. In other versions of the invention, a greater or lesser number of configurable subsystems are attachable to the extended bus.

Each of the configurable subsystems in the quadbyte boundary case has four addresses to each of which a separate function is assigned. In this case, one assignment of addresses is to designate the "00" address to a control function 210, a "01" address to a data out (from the processing system) function 214, "02" to a data in (to the processing system) function 212, and "03" to a status function 216. This configuration is shown in FIG. 7.

Furthermore, once a function assignment is made for these addresses, in one version of the invention, the configurable subsystem treats the addresses as randomly accessible. In a different version of the invention, the configurable subsystem treats an access to an unassigned address as part of a sequential process.

Figure 7:
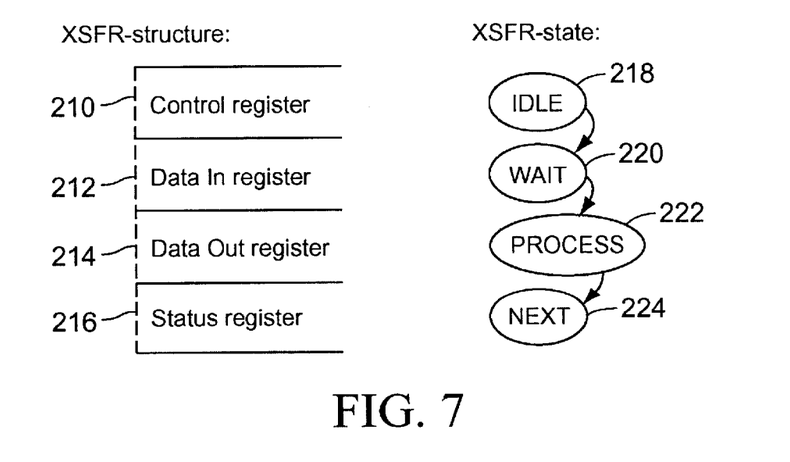
FIG. 7 shows a sequential interpretation of a group of addresses assigned to the configurable subsystem.

As show in FIG. 7, prior to any access to the unassigned space, the configurable subsystem is in the IDLE state 218. The receipt of data written to the "00" address, i.e., control data, causes the configurable subsystem to move to a WAIT state 220, in which the subsystem waits for data from the processing system. When data is written to the "01" address to the configurable subsystem, the subsystem moves to a PROCESS state 222 to process the new data and put the result in a data out register. A read at the "02" address by the processing system to obtain the result data causes the subsystem to move to the NEXT state 224 in which status information from the "03" address is obtained.

For a configurable subsystem to treat accesses to the unassigned addresses as sequential process, a finite state machine is designed into the configurable subsystem circuitry. This state machine, in some cases, operates from the CLK signal 176, in FIG. 4, provided from the processing system. This arrangement allows the state machine to cycle through a number of internal states between the states mentioned above, increasing the flexibility of the state machine. Furthermore, in some cases, the state machine has a RDY line 184, in FIG. 4 connected to the processing system. As described above, the RDY line, when active, stalls the processing unit of the processing system. This arrangement permits the processing speed of the configurable circuitry to be variable and prevents the processing system from having to repeatedly poll the status address of the configurable subsystem to determine the state of the subsystem.

Figure 8:
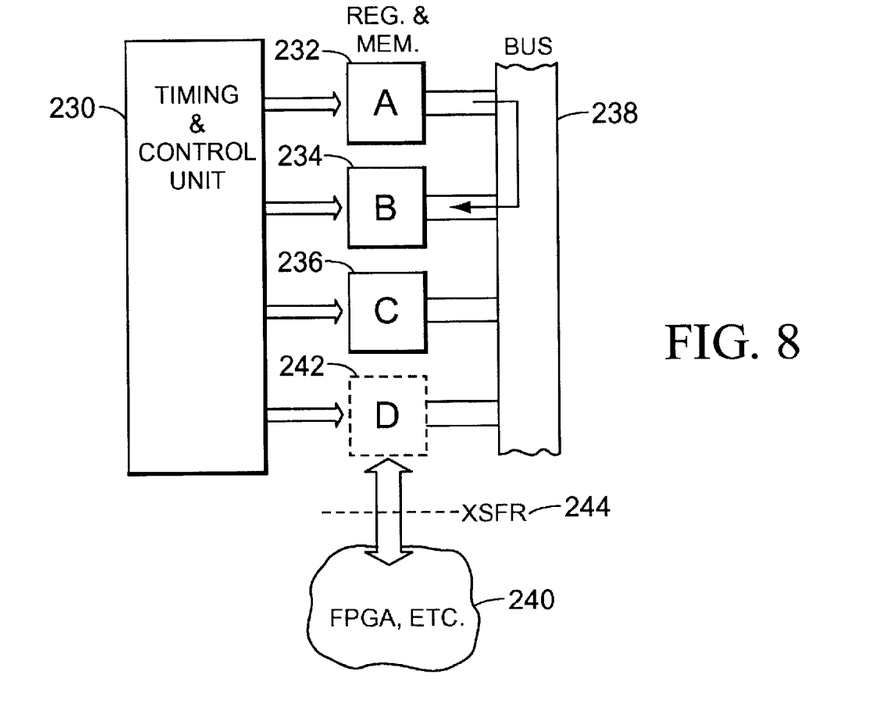
FIG. 8, shows an arbitrary processing system capable of being extended in accordance with the present invention.

In some processing systems, there is no suitable set of registers occupying a sparsely populated address space. FIG. 8 shows an arbitrary processing system having a timing and control unit 230, a number of functional units, A 232, B 234, C 236 and one or more busses 238 to which the functional units are connected. In this arbitrary processing system, data can be transferred from unit A 232 to unit B 234 by enabling the output of unit A 232 onto the bus 238 and causing B 236 to capture the data from the bus 238 into its local storage circuits. The actual timing and control of such transfers can be multi-staged (pipelined) and complex without departing from the present invention. It is desired to modify this arbitrary processing system to have an extended bus 244 to which a configurable subsystem 240 is added in accordance with the present invention.

In FIG. 8, the modification consists of adding another functional unit, D 242 to the bus and forming, from that functional unit, an extended bus 244 with the appropriate timing and control signals as required. The new unit is provided with I/O pins which make up the extended bus for this arbitrary processing system.

Beyond adding the functional unit, D, the instruction set of the processing unit in the arbitrary processing system is modified. This modification is an the addition of an instruction which, when executed, operates to transfer data to or from the added functional unit. The added functional unit D 242 has the responsibility of transferring data between the processing system bus to which it is connected and the extended bus 244 to which the configurable subsystem 240 is connected. Preferably, the added instruction uses an unassigned op code from an inexhaustively decoded instruction space.

The modified processing system operates as follows. First, the new instruction is fetched by the processing unit. Second, the processing unit decodes the new instruction and, according to the instruction, fetches data from the next location in the program store. Third, the just-fetched data is interpreted by the processing unit. If the data specifies a write to the extended bus, the next data item in the program store or data in another known location is fetched and written to the added functional unit, D. This unit then places the data on the extended bus for the configurable subsystem along with suitable timing signals that enable the subsystem to capture the data. If the data specifies a read from the extended bus, the next data item in the program store specifies or an implied location, such as the accumulator, becomes the destination location of the data to be received from the extended bus. The functional unit D 242 is triggered by the execution of the new instruction to operate suitable timing signals on the extended bus to capture the data from the configurable subsystem and the functional unit D notifies the processing unit when data is available from the unit. The processing unit then transfers the data to the specified location in the processing system. Timing signals, in one case, are similar to the timing signals discussed above for an 8051 or 8051-derivative.

Since only one bit of the data item fetched after the new instruction is needed to specify a read or a write to the extended bus, the remaining bits in the data item are free to be assigned to certain functions. One function for the remaining bits is to denote an address within the added functional unit D. Another function is to denote the number of bytes to be transferred from the processing system to the extended bus and visa-versa.

As described above, an instruction is added to the instruction set of the processing system by assigning one of the unassigned (undefined) op codes to the added instruction. Furthermore, the compiler or assembler tool for the processor must also be altered to reflect the presence of the added instruction. One common technique is to use the "define-byte" feature of a compiler or assembler as shown below.

```
|
CPU code
|
db undefined_opcode_value
db data1
db data2
|
CPU code
|
|
```

Here the "CPU code" consists of standard instructions to be executed by the processing unit of the processing system. The "db" is an assembler "directive" that tells the assembler to simply define the next byte as specified. For example, the line "db undefined_opcode_value" will result in the value of the undefined opcode being inserted in-line with the preceding CPU code. When the CPU executes this portion of the program, the undefined opcode will be picked up and an attempt will be made to execute the code. The unaltered processing unit either ignores the additional instruction or traps it as an exception. However, a suitable alteration to the instruction decoder and timing and control unit of the processing unit causes the altered processing system to recognize and execute the new instruction. Therefore, the tools and ability to interpret the undefined opcode as the extended bus-code to interface to our extended bus are present. In most cases, the undefined opcode can be placed in a table with all of the defined opcodes, and the same branching mechanism used for interpreting the undefined code as for the defined opcodes.

Prototyping

Figure 9:
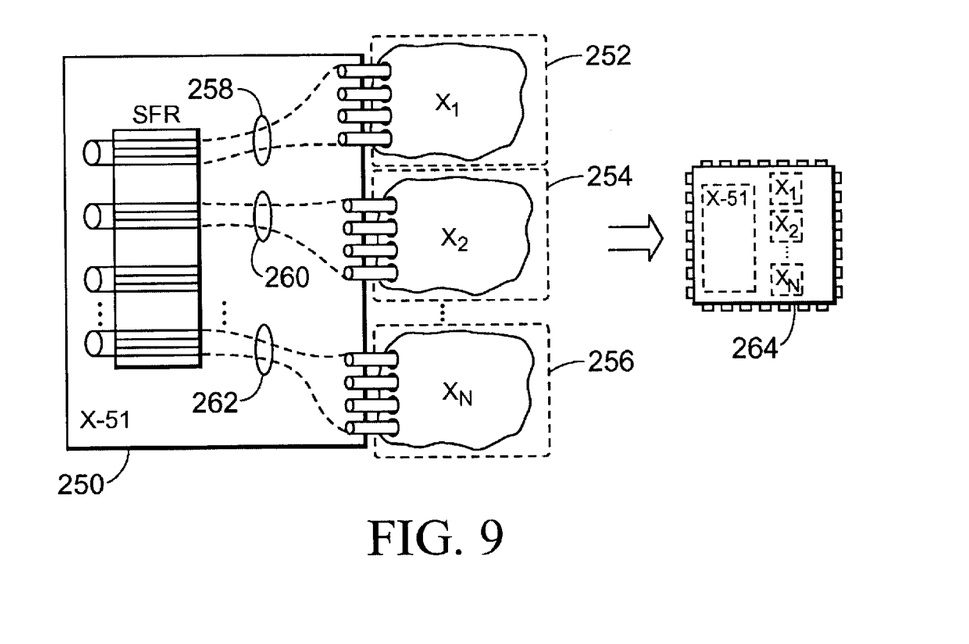
FIG. 9 shows a multi-channel configurable subsystem.

A processing system having an extended bus for connecting to a configurable subsystem is described above. The altered processing system and the configurable subsystem must be tested prior to placing the combined system into production. This calls for a technique for prototyping the combined system to verify its correctness and that it meets design requirements. For example, referring to FIG. 9, one such combined system has a modified 8051 or 8051-derivative processing system 250 with three configurable subsystems attached 252, 254, 256. Each configurable subsystem, 252, 254, 256 is connected to channel 258, 260, 262 on the extended bus, where a channel is defined as a group of contiguous addresses for communicating between the configurable subsystem and the altered processing system. Any number of channels is possible depending on the number of contiguous address blocks available from the register set address space. Each of the configurable subsystems 252, 254, 256 in FIG. 9 is either a standard cell or an Field Programmable Gate or Logic Array (FPGA or FPLA). It is preferred that standard cells be implemented on the same silicon substrate 264 as the modified processing system and that the FPGA be implemented as a separate devices from the modified processing system.

Figure 10:
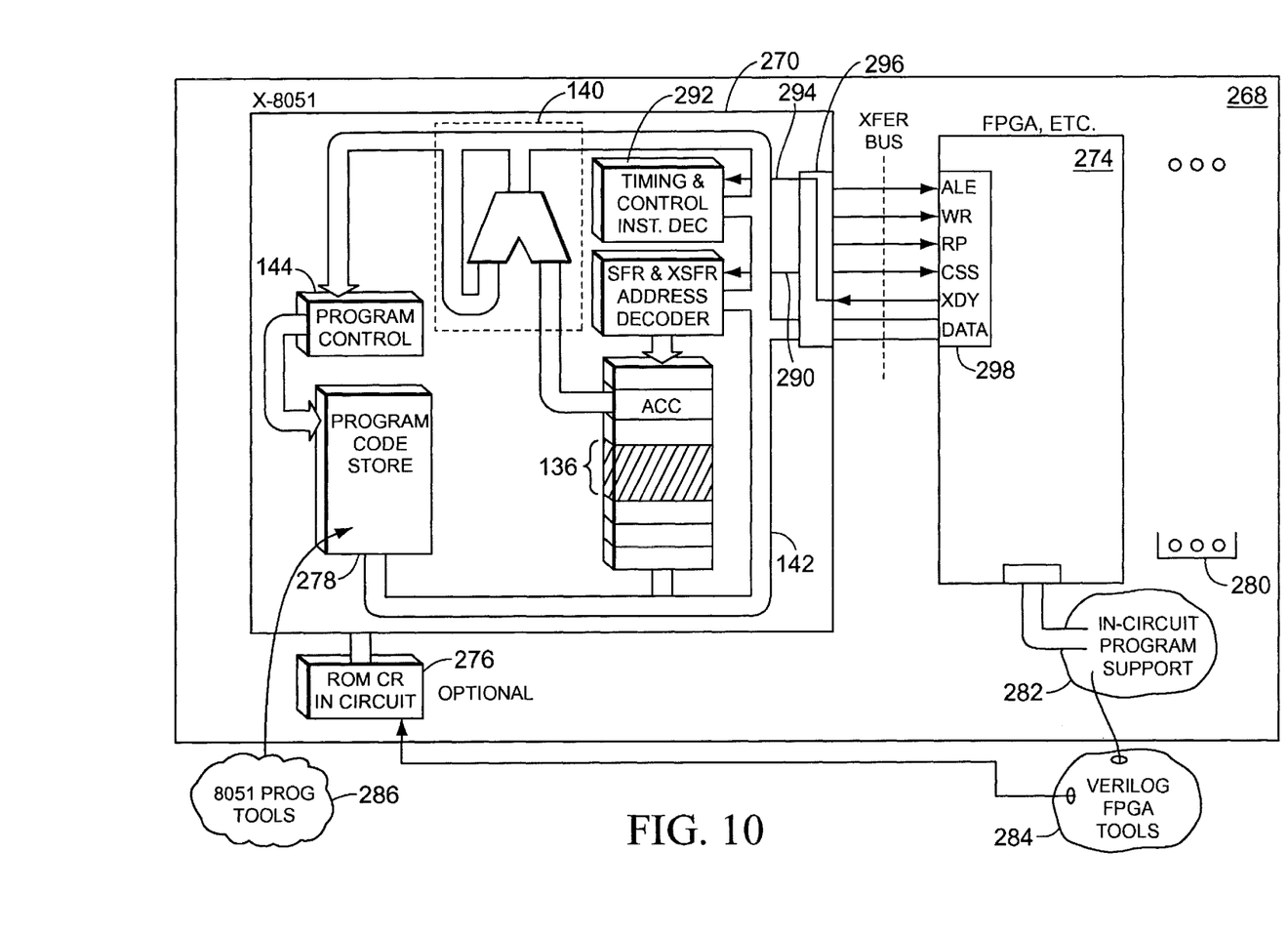
FIG. 10 shows a more expanded view of a prototyping system for verifying the combined processing system and configurable subsystem.

FIG. 10 shows a more expanded view of a prototyping system for verifying the combined processing system and configurable subsystem. The processing system 268 includes an extended processing system 270 having an extended bus 272 and a configurable subsystem 274 connected to the extended bus 272 along with an external boot ROM 276 for downloading programs to the processing system program store unit 278 and a prototyping area ("wire-wrap" area) 280 for adding circuitry or wiring needed during the prototyping. The configurable subsystem 274 also has an interface 282 for in-circuit program support.

Various tools, such as Verilog TM and FPGA tools 284, are available to store programs in the external boot ROM 276 for the processing system 270 and to configure the FPGA 274. Processing system support tools, such as the 8051 programming tools 286, are available to configure the processing system's program store 278.

The prototyping system 268 of FIG. 10, is set up and operates as follows. The processing system 270, e.g., an 8051-derivative, is modified using existing Verilog or VHDL tools 284 so that the 8051 Special Function Register address decoder recognizes a selected set of unassigned addresses 136 in the Special Function Register address space in accordance with one embodiment of the present invention. A reference to those addresses activates the CS/ signal 290 on the extended bus 272. The timing and control unit 292 of the processing unit in the 8051-derivative 270 is modified to receive a RDY signal 294 from the extended bus 272 and to force an external 8051 bus cycle to occur when the unassigned address 136 is referenced.

A printed wiring assembly (PWA) 268 is designed to support the modified 8051 270 with the extended bus 272 and a programmable logic device (PLD) 274. The PLD may be supported by a specific socket or by a "wire-wrap area" 280 on the printed wiring assembly. During development of the modified 8051 270, an FPGA is used to implement the 8051 itself. This FPGA is denoted by FPGA-8051. However, production versions utilize ASIC (Application Specific Integrated Circuit) implementations of the modified 8051 instead of FPGA versions. The FPGA-8051 must be configured either by downloading code from the Verilog/VHDL tools 284 or via the pre-loaded boot ROM 276. Also, the program store and the data storage of the FPGA-8051 either must be downloaded from the 8051 tool set 286 or from the boot ROM 276.

To test the system, the 8051 program writes known patterns to the addresses of the extended bus 136. As shown in FIG. 5, the data appears on the 8051 central bus, and the Special Function Register address decoder generates the CS/ signal on the extended bus. The read RD/ and write signals WR/ operate as described in reference to FIG. 5 and FIG. 6, and the central bus contains data appropriate to the program in the program store of the processing system. During this period the RDY signal 294 is forced inactive and the timing and control circuit modifications are tested to assure that the extended bus logic 296 is functional. After all extended bus control timing is verified, the extended bus 272 is ready to be used by an external PLD.

Next, the logic design Verilog/VHDL tools 284 are used to define an extended bus interface 298 for a standard PLD device (including PAL, EPLD, FPGA, etc.) and the in-circuit programming support interface 282 is used to download the PLD code. At this point the modified 8051 is capable of driving the configurable subsystem 274, via the extended bus 272.

After successfully testing and verifying the above subsystem, the modified 8051 270 is converted to an ASIC. The ASIC version includes an 8051 with an extended bus 272 and extended bus support. The ASIC is built in a standard package using 3 or 5 volt supplies and is used as the basis of configurable logic subsystem design. The PWA would typically be redesigned for the ASIC-8051 and would then serve as a universal prototype for configurable subsystems based on the 8051 microprocessor.

To summarize the prototyping process, the following steps are followed. First, the 8051 program is developed and simulated using legacy 8051 simulators. Second, FPGA code is developed and simulated using Verilog or VHDL simulators. Next, the prototyping system is powered up. Following this, the 8051 program is downloaded with the 8051 held in reset. Next, the FPGA code is downloaded and the 8051 is then released from reset. The modified 8051 then exercises and tests and debugs the PLD device during which the extended bus pins are monitored using standard tools such as a logic analyzer.

Figure 11:
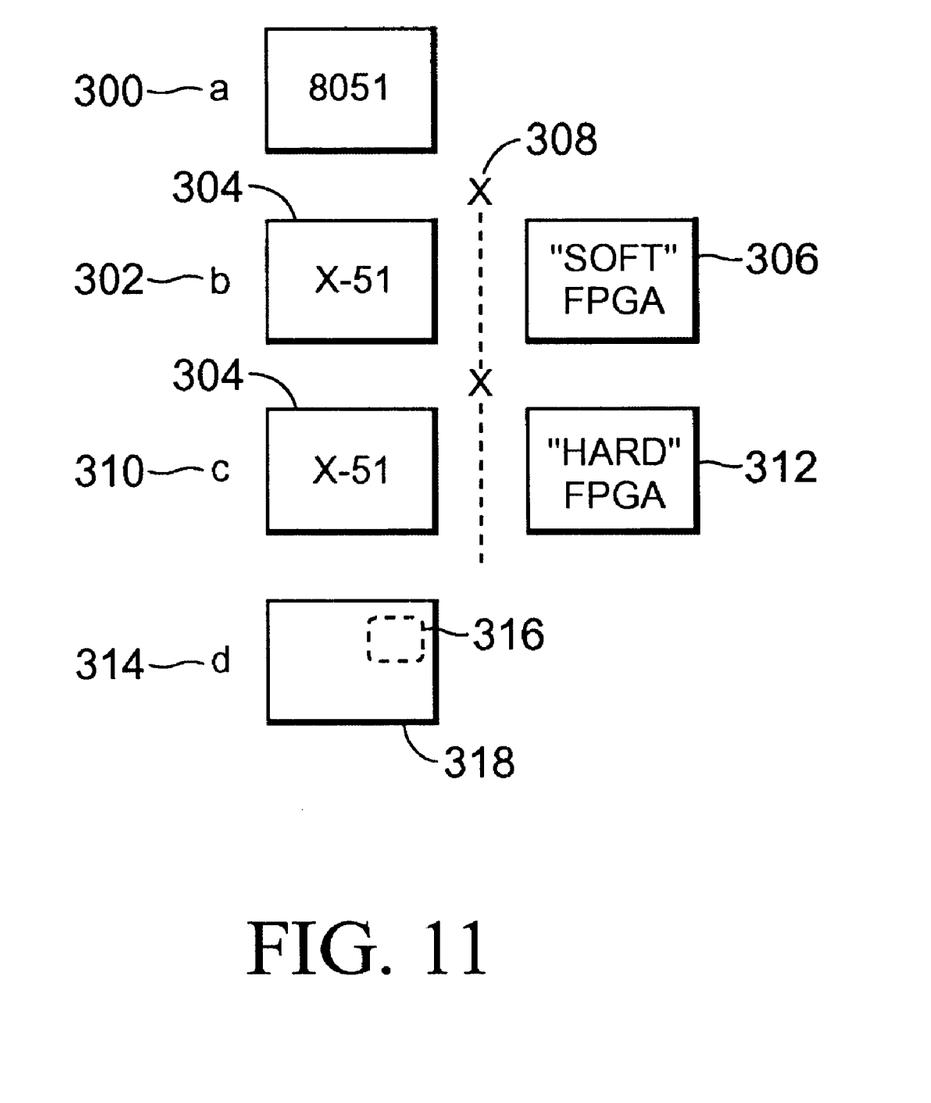
FIG. 11 shows several alternative implementations for the configurable subsystem in accordance with the present invention.

FIG. 11 shows several alternative implementations for the configurable subsystem in accordance with the present invention. Configuration A 300 represents an unmodified processing system, such as the 8051, in which the processing system implements the desired extended functionality in software. This is the simplest way to achieve the desired extended functionality but does not work for many cases because of the slow speed of the software in implementing the extended functionality.

Configuration B 302 combines a modified processing system 304 with a field programmable configurable subsystem 306 which is connected to the modified processing system via an extended bus 308 as described above. This configuration is best for rapid development but be somewhat more costly depending on the size of the FPGA.

Configuration C 310 combines a modified processing system 304 with a pre-programmed PGA 312, such as is available from American Micro Systems, Inc. of Pocatello, Id. and which is connected to the modified processing system via an extended bus 308. This configuration is best suited for medium volume production and minimizes the parts cost.

Finally, Configuration D 314 integrates the modified processing system with its extended bus and the configurable subsystem 316 onto the same silicon substrate 318. This configuration is best for high volume production and low cost.

The processing system in each of the above configurations is either an 8051 or 8051-derivative with an extended bus accessible via the unassigned addresses of the 8051 register set or an arbitrary processing system having an extended bus and a new instruction added to the unassigned instruction code space to reference the extended bus.

Thus, having the extended bus permits tradeoffs among the various configurations and gives flexibility to the designer.

Although the present invention has been described in considerable detail with reference to certain preferred versions thereof, other versions are possible. Therefore, the spirit and scope of the appended claims should not be limited to the description of the preferred versions contained herein.

What is claimed is:

1. A processing system having an extended bus, the processing system comprising:

a central bus for carrying address, data and control signals relating to the address and data on the central bus;

having at least one I/O port, connected to the central bus, the I/O port forming the extended bus having address and data signals and control signals, including a select signal relating to the address and data signals on the extended bus; and at least one functional unit connected to the central bus, the at least one functional unit having an inexhaustively decoded space, wherein use of an unassigned location in the space causes the activation of the select signal on the extended bus, wherein the functional unit includes an instruction processing unit for executing instructions and a register set residing in the inexhaustively decoded space, the instruction processing unit executing an instruction that references an unassigned location in the space to cause activation of the select signal; and wherein data is transferable between the central bus and the extended bus when the select signal is activated on the extended bus.

2. A processing system having an extended bus as recited in claim 1, wherein an instruction that causes the activation of the select signal is a movx instruction.

3. A processing system having an extended bus as recited in claim 1, further comprising an address decoder for the register set, the address decoder having an output and activating a signal on the output when the unassigned location is referenced, the select signal on the external bus being activated in response to the activated signal on the address decoder output.

4. A processing system having an extended bus as recited in claim 1, further comprising an address decoder for the register set, the address decoder activating a signal on an output when the unassigned location is referenced; and wherein the instruction processing unit includes a timing and control unit that receives the address decoder output and activates a signal on an output in response to the activated signal on the address decoder output, the select signal on the external bus being activated in response to the activated signal on the timing and control unit output.

5. A processing system having an extended bus as recited in claim 1, wherein the instruction processing unit includes a timing and control unit; and wherein the timing and control unit activates a signal on an output when the unassigned location is referenced the select signal on the external bus being activated in response to the activated signal on the timing and control unit output.

6. A processing system having an extended bus, the processing system comprising:

a central bus for carrying address, data and control signals relating to the address and data on the central bus;

at least one I/O port, connected to the central bus, the I/O port forming the extended bus having address and data signals and control signals, including a select signal relating to the address and data signals on the extended bus, wherein the control signals on the extended bus include a ready signal connected to the I/O port; and at least one functional unit connected to the central bus, the at least one functional unit having an inexhaustively decoded space, wherein use of an unassigned location in the space causes activation of the select signal on the extended bus, wherein the functional unit includes an instruction processing unit, the processing unit receiving the ready signal from the I/O port, and an inactive state of the ready signal stalling the processing unit;

wherein data is transferable between the central bus and the extended bus when the select signal is activated on the extended bus.

7. A processing system having an extended bus, the processing system comprising:

a central bus for carrying address, data and control signals relating to the address and data on the central bus;

at least one I/O port, connected to the central bus, the I/O port forming the extended bus having address and data signals and control signals, including a select signal relating to the address and data signals on the extended bus; and at least one functional unit connected to the central bus, the at least one functional unit having an inexhaustively decoded space, wherein use of an unassigned location in the space causes the activation of the select signal on the extended bus, wherein the functional unit includes an instruction processing unit for executing instructions residing in the inexhaustively decoded space, the instruction processing unit executing an instruction at an unassigned location in the inexhaustively decoded space to cause activation of the select signal; and wherein data is transferable between the central bus and the extended bus when the select signal is activated on the extended bus.

8. A method of operating a processing system with an extended bus, the method comprising the steps of:

forming the extended bus from an I/O port connected to a central bus of the processing system, wherein the extended bus includes address data and control signals, including a select signal relating to the address and data signals on the extended bus;

executing an instruction in a functional unit, connected to the central bus of the processing system, and having an inexhaustively decoded space, the instruction using an unassigned location in the inexhaustively decoded space to cause activation of the select signal on the extended bus, wherein the functional unit includes an instruction processing unit and a register set residing in the inexhaustively decoded space, the instruction processing unit executing an instruction that makes a reference to an unassigned location of the space to cause activation of the select signal; and transferring data between the central bus and the extended bus in response to executing the instruction causing the activation of the select signal.

9. A processing system having an extended bus as recited in claim 8, wherein the functional unit further includes an address decoder for the register set, the address decoder having an output and activating a signal on the output when the unassigned location is referenced, the select signal on the external bus being activated in response to the activated signal on the address decoder output.

10. A processing system having an extended bus as recited in claim 8, wherein the instruction processing unit further includes a timing and control unit that activates a signal on an output when the unassigned location is referenced, the select signal on the external bus being activated in response to the activated signal on the timing and control unit output.

11. A method of operating a processing system with an extended bus, the method comprising the steps of:

forming the extended bus from an I/O port connected to a central bus of the processing system, wherein the extended bus includes address data and control signals, including a select signal relating to the address and data signals on the extended bus;

executing an instruction in a functional unit, connected to the central bus of the processing system, and having an inexhaustively decoded space, the instruction using an unassigned location in the inexhaustively decoded space to cause activation of the select signal on the extended bus, wherein the functional unit includes an instruction processing unit for executing instructions residing in the inexhaustively decoded space, the instruction processing unit executing an instruction at an unassigned location in the inexhaustively decoded space to cause activation of the select signal; and transferring data between the central bus and the extended bus in response to executing the instruction causing the activation of the select signal.

12. A processing system having an extended bus, the processing system comprising:
   a central bus for carrying address, data and control signals relating to the address and data on the central bus;
   at least one I/O port, connected to the central bus, the I/O port forming the extended bus having address and data signals and control signals, including a select signal, relating to the address and data signals on the extended bus;
   at least one functional unit connected to the central bus, the at least one functional unit having an inexhaustively decoded space, wherein use of unassigned location in the inexhaustively decoded space causes the activation of the select signal on the extended bus;
   wherein data is transferable between the central bus and the extended bus when the select signal is activated on the extended bus; and
   a configurable subsystem having an interface connected to the extended bus and activating the interface upon receiving an activated select signal, the configurable subsystem for implementing the functional extension.

13. A processing system having a functional extension as recited in claim 12, wherein the functional extension is a computational extension.

14. A processing system having a functional extension as recited in claim 12, wherein the functional extension is a I/O function extension.

15. A processing system having a functional extension as recited in claim 14, wherein the I/O function extension is a channel, the channel defining a group of contiguous addresses on the extended bus.

16. A processing system having a functional extension as recited in claim 12, wherein the configurable subsystem is a FPGA device.

17. A processing system having a functional extension as recited in claim 12, wherein the configurable subsystem is an ASIC device.

18. A processing system having an extended bus as recited in claim 12, wherein the unassigned location refers to the configurable subsystem connected to the extended bus.

19. A processing system having an extended bus as recited in claim 12, wherein use of the unassigned location further causes activation of one or more control signals on the extended bus, the activation of the one or more control signals on the extended bus defining the timing of the data transfer between the central bus and the extended bus.

20. A processing system having an extended bus as recited in claim 19, wherein one of the control signals is an address latch enable signal indicating the presence of an address on the extended bus.

21. A processing system having an extended bus as recited in claim 19, wherein one of the control signals is a write signal indicating the presence of write data on the extended bus.

22. A processing system having an extended bus as recited in claim 19, wherein one of the control signals is a read signal for capturing read data on the extended bus.

23. A processing system having an extended bus as recited in claim 19,
   wherein the functional unit includes an instruction processing unit; and
   wherein one of the control signals is a ready signal stalling the instruction processing unit during transfers on the extended bus.

24. A processing system having an extended bus, the processing system comprising:
   a central bus for carrying address, data and control signals relating to the address and data on the central bus;
   at least one I/O port, connected to the central bus, the I/O port forming the extended bus having address and data signals and control signals, including a select signal relating to the address and data signals on the extended bus; and
   at least one functional unit connected to the central bus, wherein the functional unit includes an instruction processing unit for executing instructions and a register set residing in an inexhaustively decoded space, the instruction processing unit configured to execute an instruction that references an unassigned location in said space to cause activation of the select signal; and
   wherein data is transferable between the central bus and the extended bus when the select signal is activated on the extended bus.

25. A processing system having an extended bus, the processing system comprising:
   a central bus for carrying address, data and control signals relating to the address and data on the central bus;
   at least one I/O port, connected to the central bus, the I/O port forming the extended bus having address and data signals and control signals, including a select signal relating to the address and data signals on the extended bus; and
   means for processing, connected to the central bus, and including means for executing instructions and means for storing data, said storing means residing in an inexhaustively decoded space, wherein the means for executing institutions is configured to execute an instruction that references an unassigned location in said space to cause activation of the select signal; and
   wherein data is transferable between the central bus and the extended bus when the select signal is activated on the extended bus.

26. A processing system having an extended bus, the processing system comprising:
   a central bus for carrying address, data and control signals relating to the address and data on the central bus;
   at least one I/O port, connected to the central bus, the I/O port forming the extended bus having address and data signals and control signals, including a select signal relating to the address and data signals on the extended bus; and
   at least one functional unit connected to the central bus, wherein the functional unit includes an instruction processing unit for executing instructions in an instruction space, the instruction processing unit configured to execute an instruction at an unassigned location in the instruction space to cause activation of the select signal; and
   wherein data is transferable between the central bus and the extended bus when the select signal is activated on the extended bus.

27. A processing system having an extended bus, the processing system comprising:
   a central bus for carrying address, data and control signals relating to the address and data on the central bus;
   at least one I/O port, connected to the central bus, the I/O port forming the extended bus having address and data signals and control signals, including a select signal relating to the address and data signals on the extended bus; and means for processing, connected to the central bus, and including means for executing instructions in an instruction space, wherein the means for executing instructions is configured to execute an instruction at an unassigned location in the instruction space to cause activation of the select signal; and wherein data is transferable between the central bus and the extended bus when the select signal is activated on the extended bus.

28. A method of operating a processing system with an extended bus, the method comprising the steps of:

forming the extended bus from an I/O port connected to a central bus of the processing system, wherein the extended bus includes address data and control signals, including a select signal relating to the address and data signals on the extended bus;

executing an instruction in a functional unit connected to the central bus of the processing system to cause activation of the select signal, wherein the functional unit includes an instruction processing unit and a register set residing in the inexhaustively decoded space, the instruction processing unit executing an instruction that makes a reference to an unassigned location of the space to cause activation of the select signal; and transferring data between the central bus and the extended bus in response to executing the instruction causing activation of the select signal.

29. A method of operating a processing system with an extended bus, the method comprising the steps of:

forming the extended bus from an I/O port connected to a central bus of the processing system, wherein the extended bus includes address data and control signals, including a select signal relating to the address and data signals on the extended bus;

executing an instruction in a functional unit connected to the central bus of the processing system to cause activation of the select signal, wherein the functional unit includes an instruction processing unit for executing instructions residing in an instruction space, the instruction processing unit executing an instruction at an unassigned location in the instruction space to cause activation of the select signal; and transferring data between the central bus and the extended bus in response to executing the instruction causing activation of the select signal.

* * * * *

UNITED STATES PATENT AND TRADEMARK OFFICE
CERTIFICATE OF CORRECTION

PATENT NO.   : 6,584,525 B1
DATED        : June 24, 2003
INVENTOR(S)  : Klingman, Edwin E.

It is certified that error appears in the above-identified patent and that said Letters Patent is hereby corrected as shown below:

<u>Column 8,</u>
Line 16, reads "to simply define the next byte as specified. For example, the" should read -- to simply <u>define</u> the next <u>byte</u> as specified. For example, the --

<u>Column 10,</u>
Line 54, reads "having at least one I/O port, connected to the central bus," should read -- at least one I/O port, connected to the central bus, --

Signed and Sealed this

Ninth Day of September, 2003

JAMES E. ROGAN
*Director of the United States Patent and Trademark Office*